Figure 8:
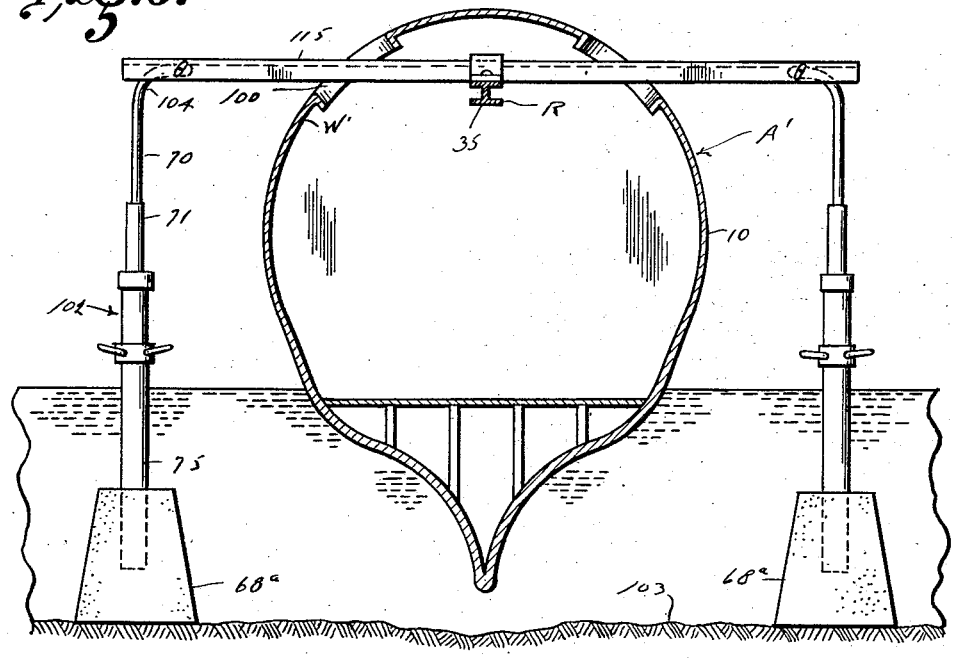

May 11, 1948.  G. O. NOVILLE  2,441,367
APPARATUS FOR HANDLING AIRCRAFT CARGO
Filed May 20, 1944  3 Sheets-Sheet 1
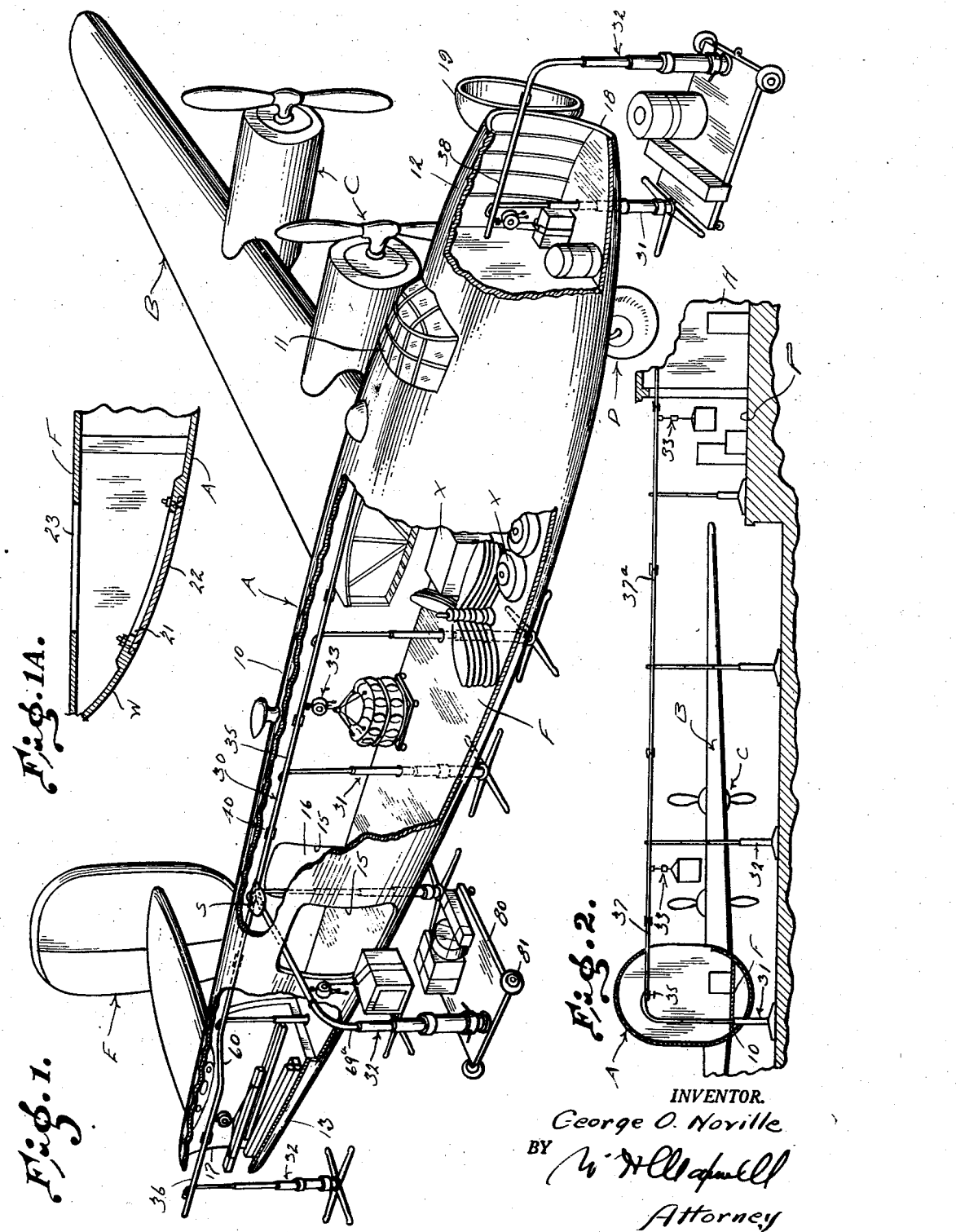
INVENTOR.
George O. Noville

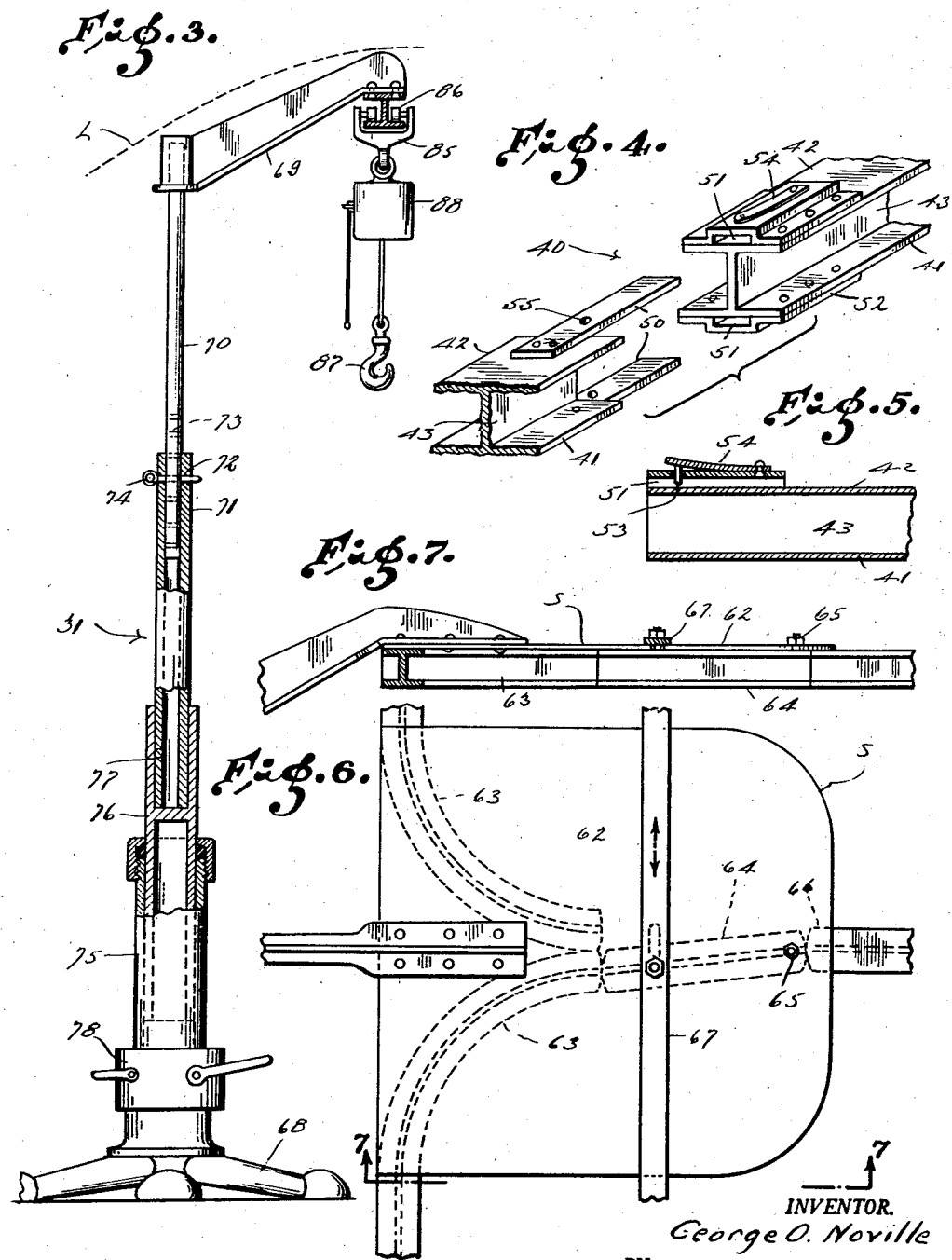

Patented May 11, 1948

2,441,367

UNITED STATES PATENT OFFICE 2,441,367

APPARATUS FOR HANDLING AIRCRAFT CARGO

George O. Noville, Van Nuys, Calif., assignor to Great American Universal Aircraft Loading Service, Los Angeles, Calif., a corporation of California Application May 20, 1944, Serial No. 536,648

16 Claims. (Cl. 244—137)

This invention has to do with apparatus for handling cargo in connection with aircraft, and it is a general object of the invention to provide improvements in the handling of cargo which result in the simplification and lightening of aircraft construction, in facilitating movement of cargo, and in materially speeding up the handling of cargo.

Aircraft of the heavier than air type known commonly as aeroplanes are becoming widely used as cargo carriers. With the development of such use of aeroplanes the cargoes handled have increased in quantity and weight and the builders of aircraft have been confronted with serious problems of construction.

Since every item of weight included in a cargo-carrying aeroplane construction cuts down the load-carrying capacity of the aeroplane, designers seek to utilize materials for essential aeroplane construction and to eliminate, as far as possible, all unnecessary parts or structures. Further, the performance of an aeroplane is dependent largely upon proper balance and, consequently the arrangement or location of the load or cargo in the aeroplane is a factor requiring careful consideration. Since the center of gravity of the usual aeroplane is in the vicinity of the point where the wings and fuselage intersect it is most advantageous to move heavy cargoes through the fuselage to locate it in the vicinity of the center of gravity of the aeroplane.

Speed is a highly important factor in handling cargo by aeroplanes. In fact, in most instances, the basic reason for using aeroplanes for the handling of cargo is to shorten or minimize the time of transportation. It is, of course, recognized that loading and unloading cargo are time-consuming operations and, therefore, every effort is made to minimize them.

It is a general object of my present invention to make possible simplified and lightened plane construction in cargo-carrying aeroplanes. The usual cargo-carrying aeroplane has a fuselage designed to establish storage space for the cargo. A floor is established in that space and an entrance or opening is provided at a suitable point through which workmen pass in carrying the cargo into and out of the aeroplane over the said floor. By my present invention substantial strength is required in the aeroplane construction to handle cargo only at the point or points where the cargo is placed, that is, by employing my invention it is unnecessary to build a substantial floor in the fuselage of the aeroplane to carry the load into and out of the aeroplane, but rather it is merely necessary to provide substantial supports in the aeroplane at the points where it is desired to carry the loads. Since it is desirable to carry the heaviest cargo close to the center of gravity of the aeroplane substantial supports for the cargo may be provided at that portion of the aeroplane but it is not necessary to provide flooring or other construction in the aeroplane ample to handle heavy cargo throughout the fuselage from the entrance opening to the point of storage.

Another object of my invention is to provide for the handling of cargo in an aeroplane so that it is movable into and out of the plane without subjecting the plane to any strain or load-carrying forces whatever. By my present invention the load is moved into the fuselage and the forces exerted by it are not imparted to the aeroplane until the load is placed at the point where it is to be carried and at the destination the load is picked up inside the fuselage and carried out entirely free of the aeroplane construction.

It is another object of my present invention to provide apparatus for handling cargo to and from an aeroplane so it is moved from a point outside of the aeroplane and entirely free thereof to any selected point in the aeroplane in one operation and without manual handling or lifting such as is necessary with the methods ordinarily employed.

Another object of my invention is to provide a cargo-carrying rail structure within the fuselage of an aeroplane without supporting the rail from the aeroplane. By my present invention I provide rail supports which enter the aeroplane through openings so that the forces incidental to the support of the rail are communicated to the exterior of the plane without being communicated through any part of the aeroplane construction.

It is another object of my invention to provide apparatus of the general character above referred which is readily adaptable to aeroplanes of various types, sizes and constructions. The apparatus can be used to service various different types of aircraft including those designed and equipped for operation on land as well as those designed and equipped for operation on water. The apparatus of the present invention is constructed in units and is adjustable so that it is highly flexible in its range of application to handle cargo to and from aeroplanes.

Figure 9:
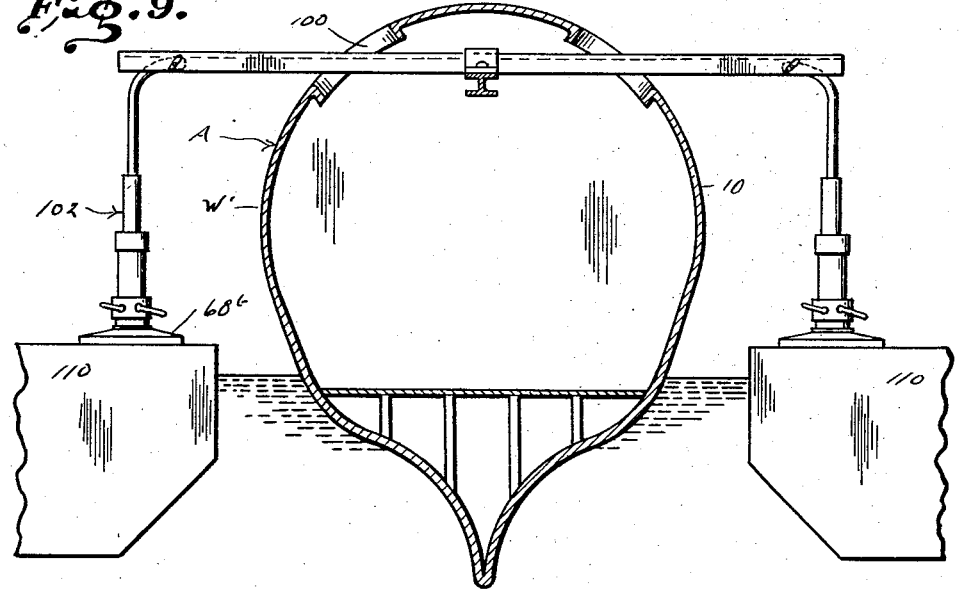

The various objects and features of my invention will be fully understood from the following detailed description of typical preferred forms and application of apparatus embodying the invention, throughout which description reference is made to the accompanying drawings, in which:

Fig. 1 is a perspective view of a typical or conventional type of cargo-carrying aeroplane showing the apparatus of the present invention related thereto for handling cargo, parts of the aeroplane being broken away to facilitate illustration of the manner in which the apparatus of the present invention is related to the aeroplane. Fig. 1A is an enlarged detailed sectional view showing a part of an aeroplane construction useful in carrying out one form of the invention. Fig. 2 is a somewhat diagrammatic view showing an aeroplane and showing the apparatus of the present invention in position to handle cargo to or from a cargo platform so that the cargo passes directly to or from the platform and the desired point in the aeroplane without being borne by the aeroplane except at the said desired point in the aeroplane. Fig. 3 is an enlarged view of one of the rail supporting standards provided by the present invention showing a rail and a cargo-carrying carriage supported thereby, various of the parts being broken away to show in section. Fig. 4 is a perspective view illustrating adjoining ends of two rail parts showing the manner in which the rail parts may be connected so that they are effectively joined when in use but are readily detachable when it is desired to take the apparatus apart. Fig. 5 is a detailed sectional view of one of the ends of one rail showing a latch construction that may be employed. Fig. 6 is a plan view of a switch construction that may be employed in carrying out the invention. Fig. 7 is a side elevation of the construction shown in Fig. 6, being a view taken substantially as indicated by line 7—7 on Fig. 6. Fig. 8 is a detailed transverse sectional view taken through the fuselage of an aeroplane in which the fuselage is designed as a buoyant structure designed to float on water showing my present invention applied thereto, and Fig. 9 is a view similar to Fig. 8 showing a somewhat different form and application of my invention.

My present invention is applicable, generally, to the handling of cargo to and from aircraft whether land based craft, hydroplanes or amphibious craft, and it is particularly useful in handling cargo to and from the usual forms of cargo-carrying aeroplanes. In the accompanying drawings I have illustrated the essential parts of a land based cargo-carrying aeroplane and have shown those parts in a manner to illustrate the application of my present invention thereto. In referring to a particular form or type of aeroplane construction I do not wish it understood that my invention is in any way limited thereto, as it will be apparent to those skilled in the art that it may be adapted to the varying conditions that are presented by different aircraft.

The aeroplane illustrated in the drawings involves, generally, an elongate body or fuselage A, wings B projecting from the sides of the fuselage at the forward end portion thereof, power units C for propelling the craft, landing gear D for supporting the craft on the ground, a tail assembly E at the rear end of the fuselage and various other parts and features of construction common to this type of aeroplane.

The particular fuselage A shown in the drawings being designed to handle cargo has a main or body portion 10, a pilot's compartment 11, forward of the body 10, a cargo-carrying nose portion 12 forward of the pilot's compartment, and a cargo-carrying tail portion 13 at the rear of the body 10 where the tail assembly E is located.

The body 10 and the tail portion 13 may form one long continuous cargo-carrying chamber provided with a suitable floor F which may be stepped along its length as the plane construction requires. This main cargo-carrying compartment or space is made accessible through one or more side openings or doorways 15 suitably located in the fuselage A. The doorways 15 in the particular case illustrated are located at the rear end portion of the body 10 of the fuselage and are normally closed by suitable closures 16. In the particular construction illustrated the extreme rear end of the fuselage is provided with an opening 17 normally covered by a suitable closure shown removed as it would be in the course of handling cargo.

The nose compartment 12 of the fuselage, which is a cargo-carrying compartment found in some cargo-carrying planes, is preferably provided with an opening 18 at its forward end which opening is normally closed by a cap 19. In Fig. 1 I show the cap opening and the apparatus of the present invention in position to handle cargo to and from the compartment established in the nose portion 12.

For carrying out my present invention with the apparatus shown in Figs. 1, 2 and 3 the aeroplane, as above described, may be of the usual form and construction except that the fuselage may, in some particular, be lightened because of the advantages gained through the present invention and except that the wall W of the fuselage 10 has openings 21 at suitable points in the lower portion of the fuselage and lengthwise of the fuselage to accommodate parts of the apparatus. The openings are normally closed by removable caps or closures 22. Where the fuselage construction is provided with a floor F and the openings 21 are below the floor as I have shown in the drawings, openings 23 are provided in the floor in vertical register with the openings 21 in the wall of the fuselage. The openings 23 may or may not be provided with closures as may be desired.

The openings 21 and 23 are provided at suitable intervals lengthwise of the fuselage and in an arrangement such as I have illustrated one such opening is provided to occur in the nose compartment while several such openings occur along the length of the body 10 and tail portion 13. The openings in the plane construction are preferably offset somewhat from the center of the plane to be located toward one side thereof as will be apparent from the drawings.

The apparatus provided by my invention involves, generally, a rail system 30 extending from a point or points exterior of the aeroplane to various points within the cargo-carrying parts or compartments of the aeroplane, standards 31 and 32 for supporting the rail system and load-carrying carriages 33 operable along the rail system for moving cargo into and out of the plane.

The rail system 30 will, in practice vary in character and extent depending upon the class or type of aeroplanes being serviced. For instance, if large aeroplanes capable of carrying heavy cargo are to be serviced the rail system is made proportionately heavy and large, whereas if small or medium-sized planes are to be serviced the rail system may be small, light and extremely simple. In any event it is preferred to construct the various parts of the apparatus of the invention of light materials so that they can be easily and quickly handled.

It will be apparent that the exact shape and extent of the rail system will, in any particular instance, depend upon the shape and extent of the cargo-carrying compartments to be serviced. By my present invention the rail system can be varied widely by reason of the sectional character of the construction. I contemplate using more or less sections and the sections may be of suitable shapes to accommodate or to meet any particular situation.

In the particular case illustrated, for example, I show a rail system involving a main rail 35 arranged longitudinally in the body 10 of the fuselage A, a rear rail section 36 arranged to extend through the tail portion 13 of the fuselage, and a lateral rail section 37 arranged to enter the fuselage through one of the doorways 15. Where the nose portion of the fuselage has a cargo-carrying compartment as shown in the drawings, a nose rail section 38 may be provided. In accordance with my invention the several rail sections are built up of a plurality of separable parts or lengths releasably connected or secured together by coupling means 40 such as I have shown in Figs. 4 and 5 of the drawings. The several rail parts are limited as to size and weight so they can be easily and quickly handled. In practice the rail sections such as sections 35 and 36 may be divided into two or three parts.

The invention further provides a suitable connection between the lateral rail section 37 and the rail sections that may be arranged within the fuselage A. In the particular case illustrated I provide a simple switch mechanism S coupling the lateral rail section 37 with the rail sections 35 and 36.

In practice I prefer to use a mono-rail system and I may form the rails in any suitable manner practical in such a system. For example, I have shown rail sections that are in the form of I-beams having lower flanges 41, upper flanges 42 and a connecting web 43 between the flanges. The upper flanges serve as means by which the rail sections are mounted while the lower flanges 41 operate to support the carriage as will be hereinafter described.

Wherever it is desirable to join or connect rail sections or parts of a rail section I may employ any suitable releasable connection. In Figs. 4 and 5 I show a typical simple construction that may be employed. This means, as illustrated, involves tongues 50 projecting beyond the end of one rail part to enter sockets 51 formed by cleats 52 secured to the other rail part. The tongues and cleats may be secured to the flanges of the rail parts in any suitable manner, as for instance, by welding, or the like. The tongues are preferably made to slidably fit the sockets 51 in order to establish a firm, stable coupling between the rail parts.

I preferably provide means for releasably retaining the tongues in the sockets so the rail parts are held together. In the case illustrated a latch pin 53 is carried on a leaf spring 54 to normally extend into socket 51. The tongue 50 which fits the socket 51 is provided with an opening 55 to receive the pin 53 when the rail parts are together in the desired position. To release the rail sections it is merely necessary to lift the leaf spring 54 disengaging the pin 53 from the opening 55 whereupon the tongues are free to be withdrawn from the sockets.

The rail sections may, in practice, be curved or suitably shaped lengthwise to accommodate parts of the aeroplane construction or the working conditions encountered. In the particular case illustrated the rear rail section 36 is shown with a bend or deflection at 60 so that the innermost portion of this rail section is somewhat higher than the section which projects through the opening 17. This vertical deflection is provided to allow the rail to pass or extend under a part of the plane construction which is lower than the switch S to which the rail section 36 is to be connected.

The switch S provided in the form of the invention shown in the drawings serves to connect the lateral rail section 37 with the main rail section 35 as well as the rear rail section 36, and it is operable to handle the cargo-carrier 33 in any desired manner between these several rail sections. It is to be understood that any suitable switch construction may be employed.

In the drawings I have shown a switch plate 62 designed to be supported by a standard such as I will describe. The plate 62 carries curved rail segments 63, the outer ends of which are to be joined in the rail sections 35 and 36, respectively, while the inner ends are arranged side by side and are to cooperate with the shiftable switch member 64. Switch member 64 has one end carried on a pivot pin 65 adjacent the inner end of the rail part 66 which is adjusted to connect with the lateral rail section 37. The shiftable switch part 64 is maintained in working position relative to the rail section 66 and can be shifted so that its outer end is in alignment with either of the parts 63. It will be apparent from Fig. 6 of the drawings how the rail section 64 can be shifted by a suitable operating lever 67 so that it handles a load carrier either to or from either of the curved segments 63.

In accordance with the broader principles of my invention I provide standards for supporting the rail system above described independently of the aeroplane itself. In the form of the invention shown in Figs. 1, 2 and 3 I do this by means of some standards which engage the rail system within the aeroplane construction and other standards which engage parts of the rail system which project from the aeroplane. I provide standards 31 of a type or construction suitable for engaging the rail system within the aeroplane construction, and I provide standards 32 of a type and construction suitable for engaging rail sections at the exterior of the aeroplane. The standards 32 are preferably such as to also serve as conveyors for the cargo to bring the cargo to the vicinity of the aeroplane.

Each standard 31, as shown generally in the drawings, involves a base 68, a sectional post, an arm 69 projecting from the upper end of the post, and adjusting means supporting the post from the base.

The sectional post preferably involves telescoping sections 70 and 71 which can be either taken apart or collapsed together to facilitate handling and which can be set to establish a post of various lengths. In the particular case illustrated the post section 71 is in the form of a tube having a transverse opening 72 while the post section 70 slidably fits the tube 71 and is provided with transverse openings 73 at longitudinally spaced points. A key or pin 74 is adapted to be arranged through the opening 72 and the selected opening 73 to set the sections 70 and 71 at the desired length.

The adjusting means or mechanism is provided by my invention for operating the post vertically and for supporting it at the desired height or in the desired vertical position. In the particular case illustrated I have shown a hydraulic adjusting means which involves a cylinder 75 mounted on the base 68 to project upwardly therefrom and I have shown a ram 76 operable in the cylinder 75 and provided at its upper end with a socket 77 to receive the lower end of the lowermost post section. A suitable hydraulic operating and control means 78 is provided so that fluid can be introduced into the cylinder 75 below the ram 76 to move the ram upwardly or to be exhausted from below the ram to allow it to descend. The mechanism just described with the control 78 may be in the nature of a hydraulic jack and any suitable details of construction found in such devices may be used in carrying out my invention.

The arm 69 carried at the upper end of the post preferably projects laterally therefrom and may project laterally and upwardly therefrom, as shown in Fig. 3, to more or less fit or conform to the inside contour of the fuselage, as is indicated by the line L in Fig. 3. The arm 69 may simply slip over and rest on the upper end of the post section 70. The outer end of the arm 69 is attached to the upper flange 42 of a rail part.

The standard 31 above described is preferably arranged and proportioned so that the operating means or at least the cylinder part 75 of the operating means is entirely outside of the aeroplane or, in other words, is under the fuselage of the aeroplane in vertical alignment with one of the openings 21. The post is inserted in the operating means to project through the openings 21 and 23 and projects upwardly into the chamber of the fuselage to the upper part thereof where the arm 69 projects laterally to support the rail part in substantial alignment with the center of the fuselage. It will be apparent how the various parts can be readily arranged in position and assembled to apply them to or remove them from the aeroplane construction.

The standard 32 may be similar, generally, to the standard 31 above described, except that instead of having a base 68 designed to merely rest on the ground it has a platform 80 which supports the cylinder 75 and which has supporting wheels 81 which facilitate its movement over the ground. The arm 69ª at the upper end of the standard is preferably adapted to make connection with the end of a rail part rather than to engage over the upper flange 42 of a rail part, as shown in Fig. 3. The arm 69ª is adapted to make connection with the end of a rail section that is projecting from the aeroplane either from a doorway 15 or from an opening such as the opening 17 or the opening 18. I have shown a standard 32 in operating position connected to the outer end of connection 37 and also a standard 32 in operating position connected with the outer end of rail section 38. In using the standards 32 cargo to be loaded into the aeroplane may be loaded onto the platforms 80 at any desired or convenient point so that it is carried to the aeroplane on the platforms in the course of moving the standards into position to be connected with the rail sections.

The load handling carriage 33 preferably involves a head 85 supported on the lower flange 41 of a rail through rollers 86, a hook 87 for making connection with cargo or a cable engaged with cargo and a suitable block or other means 88 connecting the hook and head so that the cargo can be lifted and lowered as desired. The carriage 33 is designed to be moved freely along a rail section and can be handled by the rail couplers 40 and by the switch S so that it can be moved throughout the rail system from points exterior of the aeroplane to any desired point at the interior of the aeroplane.

As an example of use of the carrier 33 it may be moved to a position at the exterior of the aeroplane where it is over the platform 80 of the standard 32 connected with the rail section 37 and there it may be operated to pick up cargo as shown in Fig. 1. The carrier can then be moved freely in along the rail section 37 and switched to the rail section 36 or to the rail section 35 as desired. In Fig. 1 I have shown a carrier within the main body of the fuselage A on the rail section 35.

It will be apparent that cargo can be moved to any desired position lengthwise of the fuselage section 10. In Fig. 1 I have shown various units of cargo X deposited in the fuselage at about opposite the point where the wings B join the fuselage.

At the forward end of the aeroplane in Fig. 1 I show a standard 32 connected to the nose rail section 38 so that cargo can be readily handled between the nose compartment and the platform of that standard. It will be apparent how a standard 32 can be connected to the outer or projecting end of the rail section 36 the same as I have shown at the rail section 38.

From the foregoing description it is believed that the apparatus that I have provided will be fully understood and also that it will be apparent how the present invention serves to greatly expedite the handling of cargo.

When an aeroplane is to be loaded the covers 22 are removed, exposing the openings 21. The standards 31 being handled in sections or partly disassembled are manipulated so that they are assembled through the openings 21 to the position shown in Fig. 1 of the drawings. The rail sections may be handled in separate parts and assembled through the coupling means 40 so that they form the rail system illustrated, which system is supported by the standards 31.

The standards 32, loaded with cargo, may be moved up to the aeroplane and the arms 69 thereof attached to the projecting ends of the rail sections.

The cargo to be loaded through the doorway is then picked up by the carriages, moved along the rail section 37 through the doorway 15, switched onto the desired rail section within the fuselage of the aeroplane, and moved along that rail section to the desired point in the fuselage. At the desired point the carriage is operated to allow the cargo to be lowered into engagement with the aeroplane. It will be observed that up to this point in the handling of the cargo it need not have touched the aeroplane directly or indirectly to apply any strain or force thereto. Consequently the aeroplane can be constructed so that it is as light as practical without providing structural members or reinforcements to carry the cargo from the doorways 15 to the points where the load is to be carried. Likewise it will be apparent that the cargo can be handled by the carriers 33 easier and quicker than it can by hand or by dollies or other equipment such as is usually employed in handling cargo. It will be understood, of course, that the equipment can be handled to lower cargo into engagement with the aeroplane at points other than those directly below the supporting rail parts. As the cargo is lowered it can be pushed to one side or the other, bringing it into the desired position of rest in the aeroplane.

It is to be understood that the unloading of the aeroplane can be carried out by reversing the operation above described, that is, a plane can be unloaded by the rail system and standards assembled as illustrated in Fig. 1, whereupon the cargo inside the aeroplane is picked up and then moved along the rail system to points outside of the aeroplane, all without subjecting the aeroplane to any strains whatsoever.

In handling the apparatus that I have provided the aeroplane may be deflected vertically. For instance, as load is applied it may settle, whereas when load is removed it may lift. To compensate for this the operating or adjusting means of the several standards can be operated to raise or lower the rail sections, as required. Through suitable occasional operation of the standards the rail sections can be kept in the proper positions in the aeroplane.

In Fig. 2 I show a form of the invention wherein I move cargo directly from a cargo platform P to the desired point inside the fuselage of the aeroplane. In this case the projecting rail section 37 is extended and connected with the platform P or a warehouse H by a rail extension 37ª that may be supported by suitable standards 31 similar to those employed inside the fuselage. The rail extension 37ª is long enough to allow the fuselage A to be arranged parallel with the side of the platform P with the wing B clearing the platform, as shown in the drawings. With this arrangement portable standards such as the standards 32 are unnecessary, and the cargo can be handled without the necessity of loading it onto the platform 80 of the standards 32.

In accordance with the broader principles of my invention I can handle cargo to and from hydroplanes as well as ordinary aeroplanes that are handled through wheeled landing gear. In applying the invention to a hydroplane or to amphibious craft I prefer to employ the general type of apparatus which is described and claimed in my co-pending application entitled "Apparatus for handling aircraft cargo," Serial No. 536,647, filed on even date herewith. In that form of apparatus no special openings or apertures are necessary in the fuselage of the aeroplane but rather the rail system within the aircraft is supported by cross arms arranged through windows or sight openings, which cross arms are, in turn, supported by standards located wholly at the exterior of the aeroplane.

In Fig. 8 I illustrate the manner in which the broad principles of the invention can be carried out in connection with the fuselage of a hydroplane which is made buoyant or to float on water. In that form of the invention the fuselage A' has a wall W' which may be continuous or uninterrupted except for suitable window openings 100. The window openings are shown located well above the water line and are provided at opposite sides of the fuselage near the top or upper portion thereof. A cross arm 101 is shown extending through opposite window openings 100 to support a rail R within the fuselage. Standards 102 are shown at the exterior of the fuselage supporting the projecting ends of the cross arm 102. In the particular form shown in Fig. 8 each standard involves a base 68ª supported on the bottom 103 of the body of water which supports the fuselage. An adjusting or operating mechanism is supported on the base 68ª and may involve a cylinder 75 and other parts such as I have described in connection with the standard 31. I have shown the post sections 71 and 70 of the standard 102 located above the level of water and I have shown a head 104 at the upper end of the post section 70 to releasably connect with the projecting end of the cross arm 115. In this case it is unnecessary to provide an arm 69 such as is described above.

In handling this form of apparatus the standards can be permanently located in a manner such as is illustrated in the drawings or that can be arranged in place after the aircraft has been located. It will be readily understood how the standards can be arranged and adjusted to effectively support the cross arm 115 so that it supports the rail R in the desired position within the aircraft. Further, it will be understood how suitable adjustments can be made from time to time to accommodate the particular position at which the fuselage is floating.

In Fig. 9 of the drawings I show an application of the invention similar to that shown in Fig. 8, except that the bases 68ᵇ of the standards 102 instead of being supported on the bottom of the body of water are supported on floating carriages or barges 110. The barges 110 can be located permanently so that they are, in effect, like wharves, or they can be such that they can be handled or moved about to properly accommodate the aircraft.

It is to be understood, of course, that when handling apparatus such as is shown in Figs. 8 and 9 of the drawings suitable guy lines of stabilizing connections will be employed to maintain the various parts in proper operating position. When the standards 102 on the barges 110 are connected, as shown in Fig. 9, the cross arm 115 serves as a spacer maintaining a proper spacing of the barges to accommodate the fuselage of the aircraft. When employing the form of the invention shown in Fig. 9 the cargo can be handled to and from the barges or lateral rail extensions can be provided for handling cargo to and from points other than the barges.

From an examination of Figs. 8 and 9 of the drawings it will be apparent that the arrangements illustrated provide for adequate support of a cargo-carrying rail within the fuselage of a hydroplane without the necessity of providing or utilizing openings in the plane at points that might in any way impair or endanger its buoyancy.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. In combination, an aeroplane having a cargo compartment with a doorway to the exterior of the aeroplane and normally closed and having an opening to the exterior of the aeroplane spaced from the doorway and normally covered, a cargo carrying rail arranged through the doorway to extend into the compartment, means for supporting the rail at the exterior of the aeroplane and for supplying cargo to and removing cargo from the rail at the exterior of the aeroplane, and a standard supporting the rail in the compartment, the standard extending from a point of support outside the compartment, freely through the opening and to the rail at a point within the compartment and communicating load from the rail to the exterior of the aeroplane independently of the aeroplane.

2. In combination, an aeroplane having a cargo compartment with a doorway to the exterior of the aeroplane and normally closed and having an opening to the exterior of the aeroplane spaced from the doorway and normally covered, a cargo carrying rail arranged through the doorway to extend into the compartment, means for supporting the rail at the exterior of the aeroplane and for supplying cargo to and removing cargo from the rail at the exterior of the aeroplane, and a standard supporting the rail in the compartment, the standard being supported externally of the aeroplane and extending freely through the opening supporting the rail independently of the aeroplane, said means including a standard on a portable platform.

3. In combination, an aeroplane having a cargo compartment with a doorway to the exterior of the aeroplane and normally closed and having an opening to the exterior of the aeroplane spaced from the doorway and normally covered, a cargo carrying rail arranged through the doorway to extend into the compartment, a cargo carriage operable along the rail, and a standard supporting the rail in the compartment, the standard being mounted exterior of the aeroplane and extending freely through the opening to engage the rail at the interior of the compartment and communicating load from the rail to the exterior of the aeroplane independently of the aeroplane.

4. In combination, an aeroplane having a cargo compartment with a doorway to the exterior of the aeroplane and normally closed and having an opening to the exterior of the aeroplane spaced from the doorway and normally covered, a sectional cargo carrying rail arranged through the doorway to extend into the compartment, and a standard mounted entirely independent of the aeroplane and supporting the rail in the compartment, the standard extending freely through the opening to engage the rail within the compartment.

5. In combination, an aeroplane having a cargo compartment with a doorway to the exterior of the aeroplane and normally closed and having an opening to the exterior of the aeroplane spaced from the doorway and normally covered, a cargo carrying rail arranged through the doorway to extend into the compartment the vicinity of the opening, and a standard supporting the rail in the compartment, the standard extending from a point entirely clear of the aeroplane freely through the opening and to the rail in the vicinity of the opening.

6. In combination, an aeroplane having a cargo compartment with a doorway and with a substantially horizontal wall with an opening therein, a cargo carrying rail arranged through the doorway to the interior of the compartment, and a support for the rail arranged vertically through the opening from a point of support remote from and independent of the aeroplane to a point within the compartment to engage and support the rail in the compartment independently of the aeroplane.

7. In combination, an aeroplane having a cargo compartment with a doorway and with a bottom having an opening, a cargo carrying rail arranged through the doorway to the interior of the compartment entirely free of the aeroplane, and a support for the rail supported at the exterior of the aeroplane independently of the aeroplane and arranged freely through the opening to engage and support the rail in the compartment.

8. In combination, an aeroplane having a cargo compartment with a doorway and with a side having an opening, a cargo carrying rail arranged through the doorway to the interior of the compartment clear of the aeroplane, and a support for the rail supported at the exterior of the aeroplane independently of the aeroplane and arranged freely through the opening to engage and support the rail in the compartment.

9. In combination, an aeroplane having a cargo compartment with a side having a doorway and with a bottom having an opening, a cargo carrying rail arranged through the doorway to the interior of the compartment free of the aeroplane, and a support for the rail supported at the exterior of the aeroplane independently of the aeroplane and arranged freely through the opening to engage and support the rail in the compartment.

10. In combination, an aeroplane having a cargo compartment with a vertical wall having a doorway and with a bottom having an opening, a cargo carrying rail arranged freely through the doorway to the interior of the compartment, and a support for the rail supported at the exterior of the aeroplane independently of the aeroplane and arranged freely through the opening to engage and support the rail in the compartment.

11. In combination, an aeroplane having a cargo compartment with a doorway to the exterior of the aeroplane and normally closed and having an opening to the exterior of the aeroplane spaced from the doorway and normally covered, a cargo carrying rail arranged freely through the doorway to extend into the compartment, and a standard supported exterior of the aeroplane and independent thereof and supporting the rail in the compartment free of the aeroplane, the standard extending freely and vertically through the opening to engage the rail at a point within the compartment.

12. In combination, an aeroplane having a cargo compartment with a doorway to the exterior of the aeroplane and normally closed and having an opening to the exterior of the aeroplane spaced from the doorway and normally covered, a cargo carrying rail arranged freely through the doorway to extend into the compartment, means for supporting the rail at the exterior of the aeroplane independently thereof and for supplying cargo to and removing cargo from the rail at the exterior of the aeroplane, and a standard supported by a portable platform located outside of the aeroplane independently thereof, the standard supporting the rail in the compartment, the standard extending freely through the opening, said means including a standard on a portable platform.

13. In combination, an aeroplane having a cargo compartment with a side doorway to the exterior of the aeroplane and normally closed and having a bottom opening to the exterior of the aeroplane spaced from the doorway and normally covered, a cargo carrying rail arranged through the doorway to extend into the compartment free of the aeroplane, and a standard supported at the exterior of the aeroplane independently of the aeroplane and supporting the rail in the compartment, the standard extending freely through the opening to engage the rail at a point within the compartment.

14. In combination, an aeroplane having a cargo compartment with a side doorway to the exterior of the aeroplane and normally closed and having a bottom opening to the exterior of the aeroplane spaced from the doorway and normally covered, a cargo carrying rail arranged through the doorway to extend into the compartment free of the aeroplane, means for supporting the rail at the exterior of the aeroplane independently of the aeroplane and for supplying cargo to and removing cargo from the rail at the exterior of the aeroplane, and a standard supporting the rail in the compartment independently of the aeroplane, the standard extending freely vertically from a point of support outside of the aeroplane up through the opening, said means including a standard on a portable platform.

15. In combination, an aeroplane having a cargo compartment with an opening and a doorway, a cargo carrying rail arranged through the doorway to the interior of the compartment independently of the aeroplane, and a support for the rail arranged through the opening to engage and support the rail in the compartment, the support including a vertical part extending from a point of support outside and independent of the aeroplane freely through the opening and a horizontal part engaging the rail within the compartment.

16. In combination, an aeroplane having a cargo compartment with an opening and a doorway, a cargo carrying rail arranged through the doorway to the interior of the compartment independently of the aeroplane, and a support for the rail arranged through the opening to engage and support the rail in the compartment, the support including a vertical part at the exterior of the aeroplane supported independently of the aeroplane at the exterior thereof and a horizontal part extending freely through the opening and engaging the rail within the compartment.

GEORGE O. NOVILLE.

REFERENCES CITED

The following references are of record in the file of this patent:

UNITED STATES PATENTS

| Number | Name | Date |
|---|---|---|
| 1,395,749 | Thorn | Nov. 1, 1921 |
| 1,406,656 | Knight | Feb. 14, 1922 |
| 1,783,021 | Leoch | Nov. 25, 1930 |
| 2,272,949 | Kidder | Feb. 10, 1942 |
| 2,322,636 | Kidder | June 22, 1943 |
| 2,332,240 | Lavalley | Oct. 19, 1943 |

FOREIGN PATENTS

| Number | Country | Date |
|---|---|---|
| 167,068 | Great Britain | Aug. 4, 1921 |

OTHER REFERENCES

"Scientific American," Oct. 9, 1920, page 271, vol. CXXIII, Number 15.